INVENTOR.
GEORGE A. MITCHELL,
BY
Baukelaw & Seawell Lowry
ATTORNEYS.

Feb. 21, 1956 G. A. MITCHELL 2,735,333

MOTION PICTURE-TELEVISION SYSTEM WITH INTERMITTENT FILM MOVEMENT

Filed July 14, 1951 4 Sheets-Sheet 2

INVENTOR.
GEORGE A. MITCHELL,
BY Berkelew & Scantlebury
ATTORNEYS.

INVENTOR.
GEORGE A. MITCHELL,
BY Buckhorn & Seaulebury
ATTORNEYS

INVENTOR.
GEORGE A. MITCHELL,
BY
Boykelew & Scantlebury
ATTORNEYS.

United States Patent Office 2,735,333

Patented Feb. 21, 1956

2,735,333

MOTION PICTURE-TELEVISION SYSTEM WITH INTERMITTENT FILM MOVEMENT

George Alfred Mitchell, Pasadena, Calif., assignor to Mitchell Camera Corporation, Glendale, Calif., a corporation of Delaware Application July 14, 1951, Serial No. 236,751

5 Claims. (Cl. 88—18.4)

This invention has to do with the translation of pictures in systems involving both television and motion pictures.

As is well known, a fundamental problem in correlating television signals and motion picture film images results from the fact that motion picture equipment conventionally utilizes a film frame frequency of 24 frames per second, while television operates at a standard field scansion frequency of 60 fields per second. The problem of reconciling that difference of frequency has led to various specialized techniques, none of which has proved fully satisfactory.

An important characteristic of the present method is that the motion picture film is held stationary during substantially the whole of every television field scansion. The film is moved only during periods of television ray retrace between television field scansions. That characteristic offers the marked advantage that the time available for optical projection of the picture image is greatly increased relative to previous systems.

A further characteristic of the present method is that any one film frame of the motion picture film corresponds to an integral number of television pictures. All problems of fitting together two portions of a picture image without overlap are thereby avoided. In previous practice such problems are particularly serious in motion picture photography of received television pictures. By completely avoiding those problems, the present invention greatly facilitates that aspect of the translation of picture images.

More particularly in the generation of television signals corresponding to and representing successive picture frames of a motion picture film, the increased projection time made possible by the present invention offers the advantage of raising the effective level of illumination when a storage type light-sensitive element is utilized. The effective gain in illumination may correspond to a factor of ten to fifteen, and in practice leads to a significant improvement in quality of the final television image.

In a preferred form of the invention, the motion picture film from which television signals are to be generated is itself scanned by a moving light beam, and the transmitted beam energy is utilized directly to generate an electrical signal without recourse to any memory device. That method avoids any degradation of the television image by the finite grain structure of mosaic memory devices.

An important further characteristic of the invention is the provision of an intermittent film moving mechanism of a type that is capable of giving a very rapid film pull down and that can be operated in a manner to advance the film in a multiple periodic cycle of intermittent movement. For example, in a preferred embodiment of the invention, two distinct periods of intermittent film movement are utilized, alternating with each other. Those two periods are typically equal respectively to two and three times the field scansion period of the television apparatus. Successive periods of film dwell then include alternately two and three complete television field scans.

With present television standards, those alternating periods are $\frac{1}{30}$ and $\frac{1}{20}$ second, respectively, so that the average period of film advancement is $\frac{1}{24}$ second, as required by normal motion picture technique. By providing the described type of multiple periodic action in an intermittent movement of a type capable of giving the required very rapid pulldown, and by operating the movement in such timed relation to the television apparatus that the periods of film advance lie substantially within field retrace periods of the television scansion, the present invention maintains the film stationary in position for image projection throughout all periods of television scansion.

The invention typically utilizes a mechanism of claw type, which is inherently capable of very fast pulldown, and provides for the first time means for operating such a mechanism in a multiple periodic cycle of action. The invention is capable of providing a great variety of detailed types of multiple periodicity, but will be described for definiteness primarily in terms of that particular type that is preferred for use in association with present standard television apparatus. In a typical embodiment providing that illustrative type of multiple periodicity, the film engaging claw is moved longitudinally of the film guide in a uniformly periodic cycle of movement, each cycle typically including one forward and one return stroke. The claw is moved transversely of the film guide in a coordinated meshing movement that brings the claw into engagement with a film in the film guide at meshing periods that include only certain selected ones of the forward strokes of the longitudinal claw movement. Those forward strokes of the claw are thereby made effective to advance the film, while other forward claw strokes, during which the transverse claw movement prevents film engagement, are inffective. The forward claw strokes that are selected to be thus rendered effective, in accordance with the present invention, are spaced non-uniformly in time. For example, successive forward claw strokes that are caused to advance the film may be separated alternately by two distinct time periods. A complete periodic cycle of transverse claw movement then includes two periods of film engagement and two periods of film release, the latter two periods being unequal.

As a specific example, the cycle of transverse claw movement may be such as to produce film engagement during one forward longitudinal stroke of the claw; film release during the following return stroke and during the entire following cycle of longitudinal claw movement; film engagement during the next forward stroke of the claw; and film release during the following return stroke and during the entire following two cycles of longitudinal claw movement. With that illustrative arrangement, each complete cycle of transverse claw movement corresponds to five cycles of longitudinal claw movement. The longitudinal claw movement is caused to advance the film, for example, on the first and third forward strokes of every series of five forward strokes, giving two advances of the film every five cycles of longitudinal movement. The system is so coordinated with the associated television apparatus that a cycle of the longitudinal claw movement corresponds directly with a cycle of television field scansion ($\frac{1}{60}$ second), and that the forward claw strokes are synchronized with, and are preferably confined to, retrace periods of the television scansion. Thus the motion picture film is advanced two frames for every five field scans of the television apparatus, as in previous systems; but, in sharp contrast to previous systems, the film advance is limited entirely to television retrace periods, permitting image projection (whether of a film frame or of a received television picture) during the whole of all television scansion periods. The timing is such that one film frame is correlated with the whole of two consecutive television scans, the next film frame with the three following television scans, the next film frame again with the following two scans, and so forth.

Such multiple periodic action of the meshing (or transverse) movement of the claw may be produced by many different specific mechanisms. The distinctive characteristic of the required mechanism may be defined broadly as producing a periodically repeated cycle of transverse claw movement, each cycle including a plurality of claw excursions into film engagement spaced non-uniformly in time. Further, although themselves non-uniformly spaced in time, those claw excursions into film engagement coincide respectively with definite ones of the forward strokes of the claw in its longitudinal movement. Whereas the totality of forward claw strokes are uniformly spaced in time, those particular forward claw strokes with which transverse excursions into film engagement coincide are spaced non-uniformly in time. The particular type of non-uniformity described above, namely, alternation between two and three cycles of longitudinal claw movement, is merely illustrative of many detailed types of action obtainable within the scope of the invention.

Whereas some aspects of the invention relate broadly to the translation of image representations in either direction between television signals and successive frames of a motion picture film, other of its features are peculiar to television signal generation. Accordingly, the invention may best be described primarily with specific reference to that context. A full understanding of the invention and of its further objects and advantages will be had from the following description of certain typical embodiments. Specific details of that description, and of the accompanying drawings which form a part of it, are intended by way of illustration, and not as a limitation upon the scope of the invention.

Figure 4:
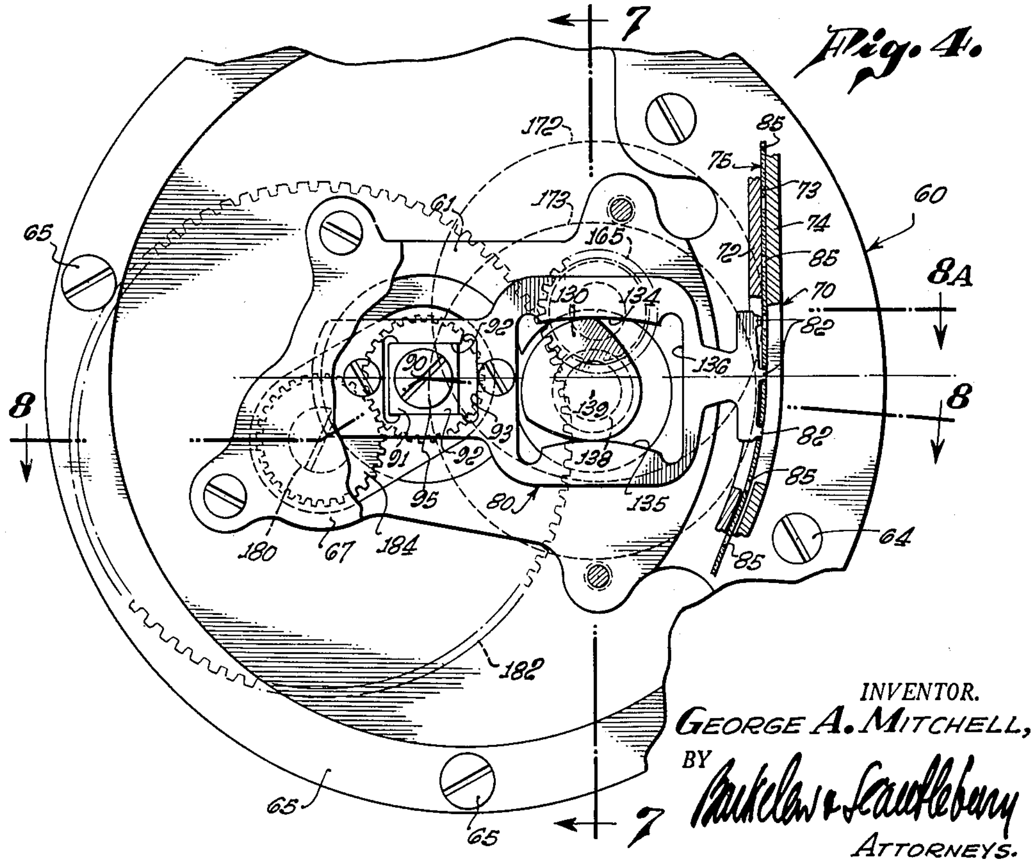
Fig. 4 is a front elevation, partly broken away, showing an illustrative embodiment of a film intermittent mechanism in accordance with the invention.
Figures 7, 8:
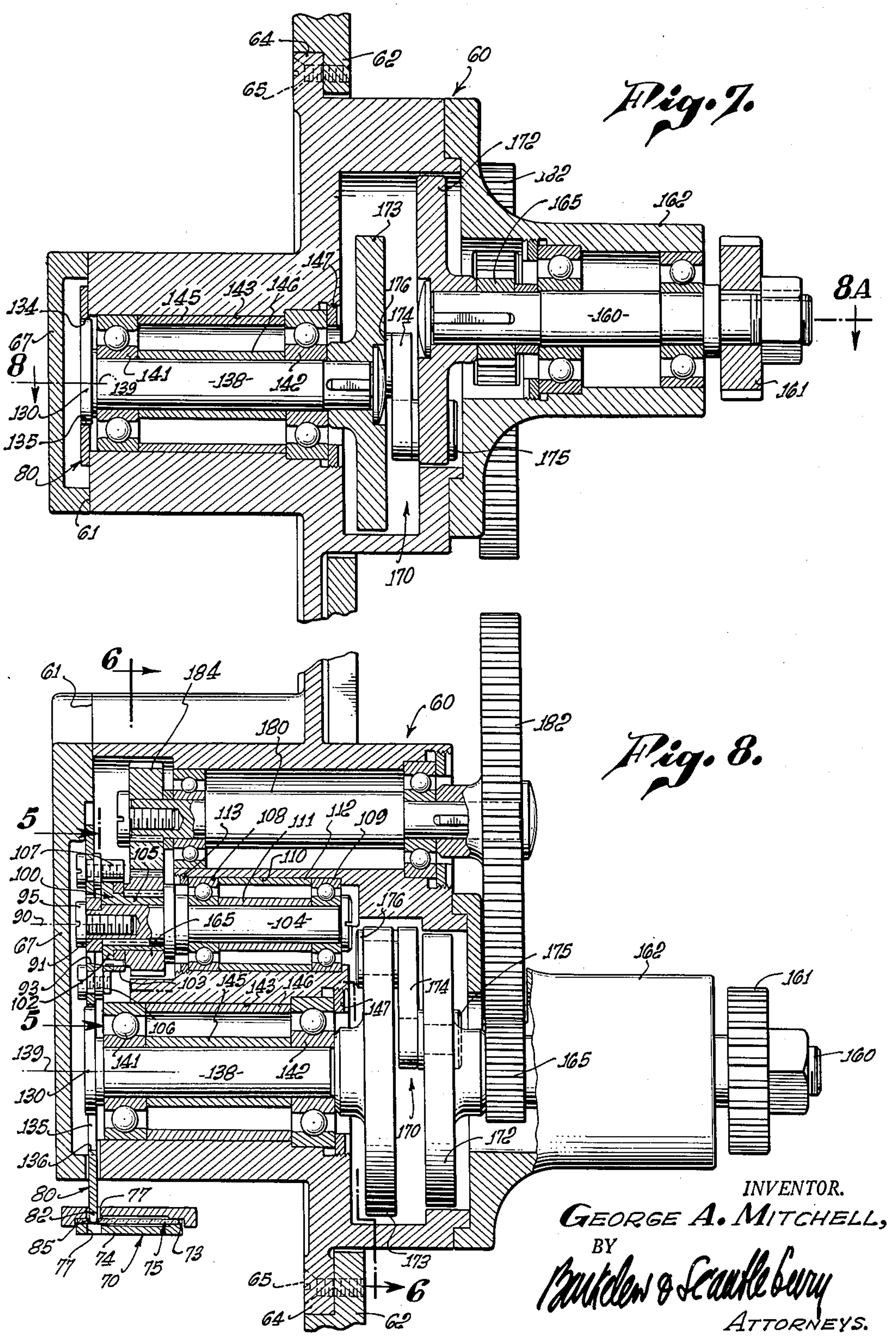
Fig. 7 is a vertical section on line 7—7 of Fig. 4.

Fig. 8 is a horizontal section taken partly on line 8—8 and partly on line 8—8A of Figs. 4 and 7.

Figure 1:
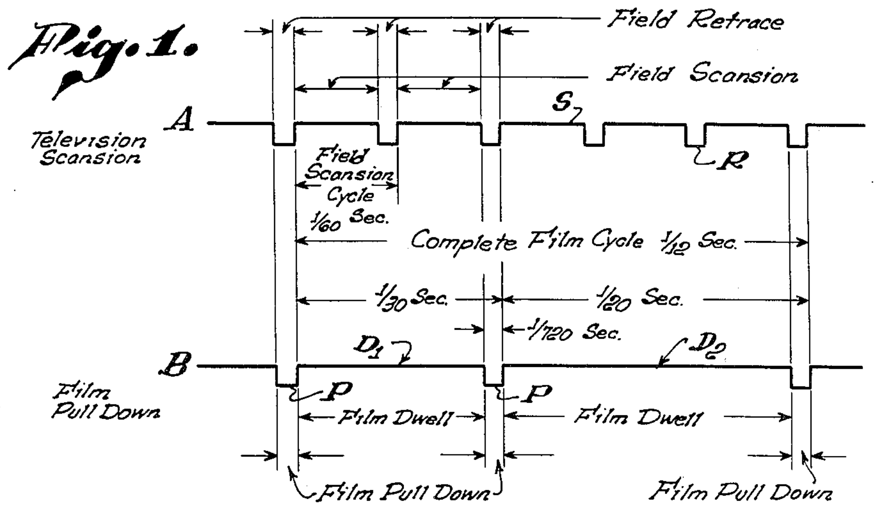
Fig. 1 is a diagram illustrating a preferred time relationship between film moving mechanism and television scansion in accordance with the invention.

In Fig. 1 curve A illustrates a series of typical periodic scansion-cycles of television apparatus, the elevated portions S of the curve representing periods of television field scansion, and the depressions R in the curve representing ray retrace periods between field scansions. As indicated below the curve for purposes of illustration, one complete cycle of such television scansion, may occupy $\frac{1}{60}$ second, in accordance with present conventional practice, the field scansion S occupying approximately $\frac{11}{720}$ second and the retrace R approximately $\frac{1}{720}$ second. Curve B illustrates a typical complete periodic cycle of intermittent film movement in accordance with the invention, showing in particular a preferred time relationship between that cycle and the television scansion. In curve B the elevated portions $D_1$ and $D_2$ represent periods of film dwell, during which the film is held stationary with a film frame in position for image projection. The depressions P represent periods of film movement, frequently referred to as film pull down, during which the film is advanced to bring another film frame into position for projection. A complete cycle of periodic film movement includes two periods of film pull down P alternating with two periods of film dwell. One of the periods of film dwell $D_1$ occupies two successive television periods of field scansion S and the intervening period of field retrace R. The other period of film dwell $D_2$ occupies three successive television periods of field scansion S and the two intervening periods of field retrace R. The periods of film pull down P substantially coincide with, and are preferably confined to, television periods of field retrace R. A complete periodic cycle of film movement thus occupies five successive periodic cycles of television field scansion, lasting $\frac{1}{12}$ second under present standard practice.

It will be seen from Fig. 1 that every television period of field scansion S occurs during, and is limited to, a period of film dwell $D_1$ or $D_2$.

Figure 2:
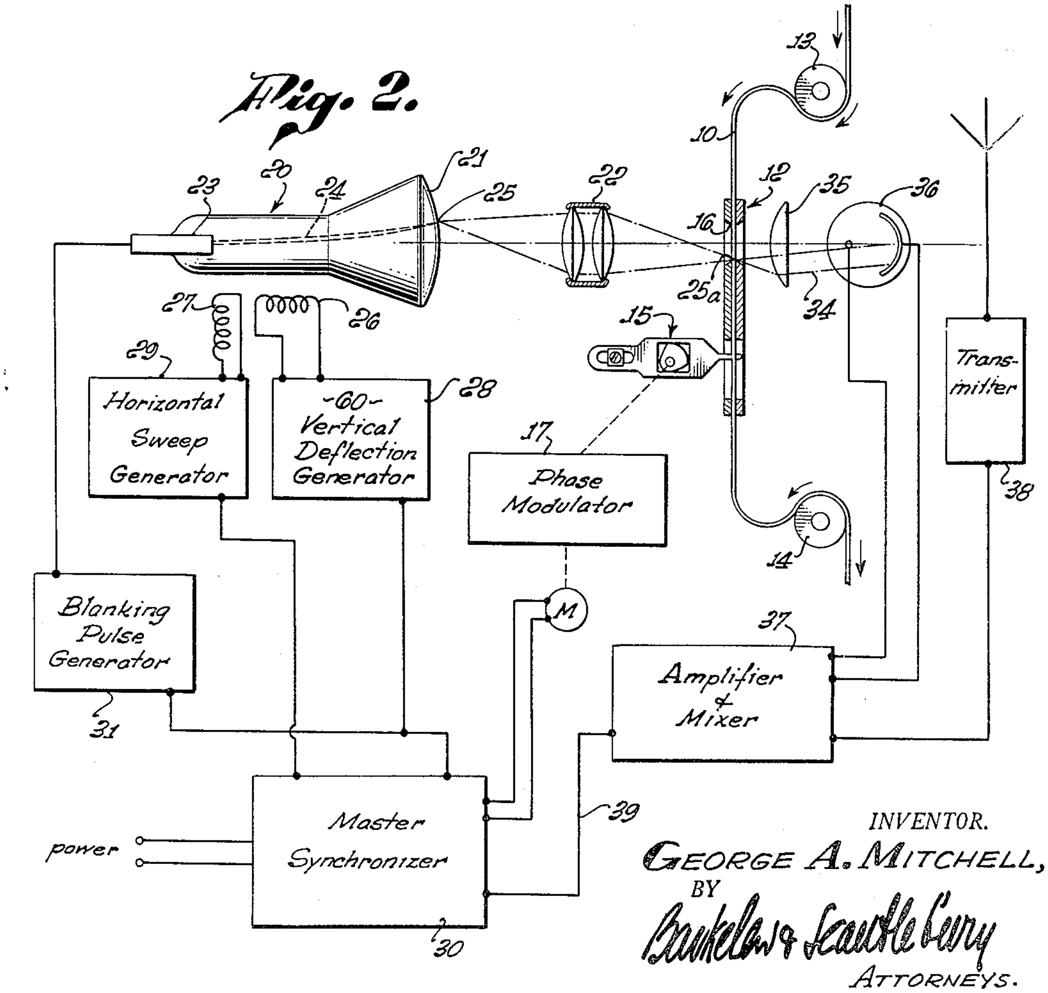
Fig. 2 shows schematically an illustrative system of preferred type for developing television signals from a motion picture film in accordance with the invention.

In Fig. 2 a motion picture film is indicated at 10, supported in a film guide 12, to which it is fed by a continuously rotating feed sprocket 13 and from which it is received by a continuously rotating takeup sprocket 14. A film intermittent mechanism of the claw type is indicated schematically at 15, adapted to advance film 10 along film guide 12 in such a manner that successive film frames are exposed in sequence at the exposure aperture 16 in the film guide. Intermittent mechanism 15 is driven, as indicated schematically by the dashed lines, from an electric motor M, preferably of synchronous type, through a phase modulating device which causes the intermittent movement to follow a multiple periodic cycle of operation of the type shown at B in Fig. 1. Such a device is represented schematically at 17 in Fig. 2. A specific illustrative embodiment in which device 17 is incorporated in the intermittent mechanism will be described.

A light source for producing a light beam capable of rapidly scanning the area of a film frame at aperture 16 of the film guide is represented schematically in Fig. 2, illustratively embodying a cathode ray tube 20 with a tube screen 21, the surface of which is imaged optically, as by an objective lens 22, at aperture 16. An electron gun 23 within tube 20 produces in known manner a cathode ray beam 24, which is brought to sharp focus at screen 21 to form a luminous spot 25. The position of spot 25 is deflected in two coordinates on screen 21 by suitable deflection coils 26 and 27, which typically determine the vertical and horizontal spot positions, respectively. Deflection currents for coils 26 and 27 are provided by a suitable vertical deflection generator 28 and by a horizontal deflection generator 29, respectively, acting in known manner in response to electrical timing signals supplied by a master synchronizer 30 to cause spot 25 to scan a definite area of tube screen 21. That scansion typically includes a relatively high frequency horizontal sweep movement and a much slower vertical field scansion movement. The latter movement, which has typically a period of $\frac{1}{60}$ second, determines the field scansion frequency, since the scanned area of screen 21 is covered once each cycle of vertical beam deflection. (Such refinements as interlaced scansion may be introduced by known means without affecting the principles of operation of the invention. Whether successive scans are interlaced or not, the entire area scanned is considered to be effectively covered during each field scansion cycle.) Approximately $\frac{1}{12}$ of the field scansion cycle is typically occupied by the vertical retrace movement of the ray in preparation for a successive scan. Blanking means, shown schematically at 31, are preferably provided, acting under control of a periodic timing signal generated at 30 to deliver to electron gun 23 an electrical pulse that reduces the energy of beam 24 effectively to zero during each retrace movement of the beam in its scansion cycle. Thus spot 25 is luminous only during its scansion movement, and is effectively dark during periods of field retrace (R in Fig. 1).

The fluorescent material employed in preparation of tube screen 21 is of a type having very rapid decay, so that, even under conditions of rapid deflection movement of cathode ray beam 24, the screen is effectively luminous only very close to the actual point of impact of the focused beam. The result is a flying spot of light that is emitted effectively from a point 25 which scans systematically a predetermined area of screen 21. That area and the constants of lens 22 are so selected that the image 25*a* of spot 25, formed at film 10, correspondingly scans the area of a film frame in aperture 16, only substantially a single point of that area being illuminated at any given instant. The energy of the light beam that forms image 25*a* is effectively constant during scansion movement of the image, but the fraction of that energy that passes through film 10 to form transmitted light beam 34 depends upon the film density at the instantaneous location of image 25*a*. That transmitted beam 34 may be condensed by a collector lens 35 and is received by a light responsive device, shown illustratively as a photoelectric cell 36.

The electrical output of device 36 is amplified by means indicated schematically at 37 and is utilized as the video signal representing the film 10. That video signal is mixed at 37 with suitable timing signals supplied over line 39 in known manner by master synchronizer 30, and the combined signal is broadcast by transmitter means represented at 38 for normal television reception by conventional receiving sets. The timing signals supplied from master synchronizer 30 over line 39 are simultaneous with, or have suitable time relation to, the timing signals supplied to vertical deflection generator 28 and sweep generator 29, so that the scansion movement of the cathode ray beam of a conventional television receiving sets corresponds to the scansion movement of spot 25 and its optical image 25*a*. The video signal derived from device 36 and received by the receiving set may therefore be utilized in the usual way to modulate the intensity of the cathode ray beam in the receiving set, producing a received picture that corresponds to the picture scanned at aperture 16. Such a received picture is generated in response to each scansion cycle of image 25*a*.

Intermittent mechanism 15 is operated in suitable phase relation to the scansion movement of image 25*a*. That relation, as indicated in Fig. 1, is such that film pull down movement is confined to field retrace periods of the scansion (during which image 25*a* has effectively zero intensity). Such phase relation may be obtained, as shown, by operating motor M on alternating current supplied from master synchronizer 20 at suitable frequency and with suitable phase relation to the synchronizing signals delivered to vertical deflection generator 28. When intermittent mechanism 15 is operated in the manner already described in connection with phase modulator 17, two successive television pictures are derived from one film frame of film 10, and the next three television pictures are derived from the next film frame, that alternating periodicity being repeated every five field scansion cycles. It will be noted that every television picture is derived by means of a single complete scansion of a film frame; and that the scansion operation by which the video signal is derived is carried out directly at the film, not on a supplementary surface having a discrete grain structure.

Figure 3:
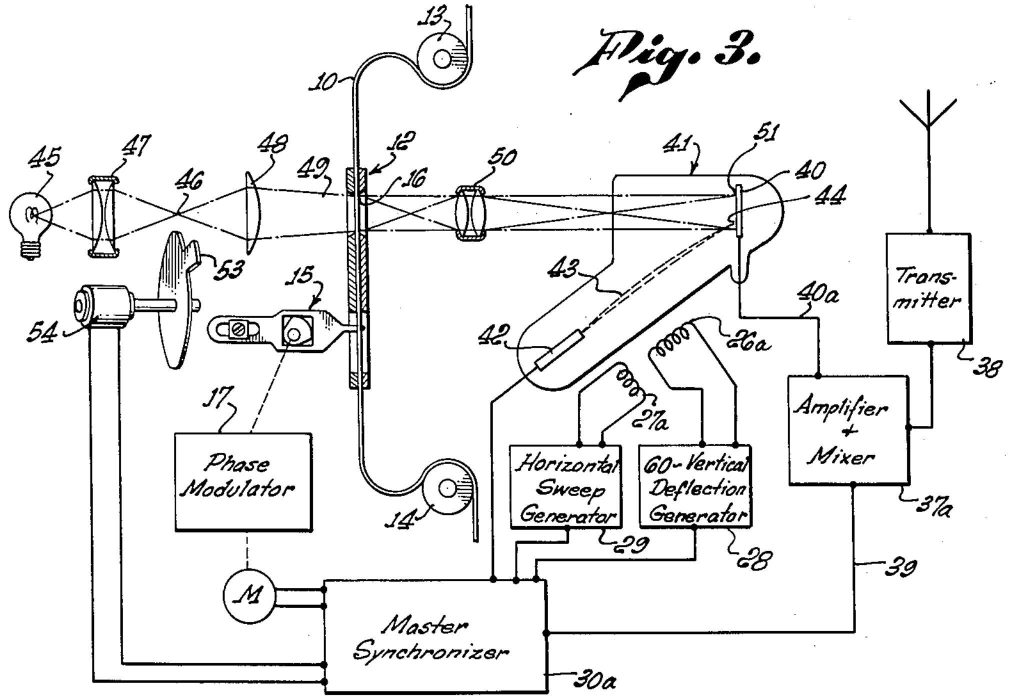
Fig. 3 shows schematically an alternative system.

In the illustrative system of Fig. 3, film 10 is moved intermittently along film guide 12, as already described in connection with Figs. 1 and 2, under speed and phase control of the master synchronizer 30*a*. Light from a source of continuous illumination, shown typically as an incandescent lamp 45, is preferably first brought to a focus 46 by optical means such as lens 47 for a purpose that will appear. The light from aerial image 46 is then formed into a beam 49, as by a second lens 48. Light beam 49 is utilized to illuminate film 10 at exposure aperture 16. An image 51 of the film, thus illuminated, is formed by optical means, represented as objective lens 50, upon a mosaic screen 40 of known construction, mounted within an evacuated tube 41. An electron gun 42 within the tube is arranged to emit a cathode ray beam 43. That beam is brought to a focus 44 by electromagnetic means at the surface of screen 40, and is caused to scan the area occupied by film image 51. Such scansion movement may be produced by suitable periodic currents in vertical deflection coil 26*a* and horizontal deflection coil 27*a*, those currents being produced, for example, in vertical deflection generator 28 and horizontal sweep generator 29, respectively, under control of timing signals from master synchronizer 30*a* in a manner analogous to that described in connection with Fig. 2.

Electric charges are stored selectively on the several elements of mosaic 40 by action of light image 51, producing an electrical image of film 10. Those charges are released progressively by beam 43 as it moves over the image in scansion. The resulting current is taken over lead 40*a*, amplified at 37*a*, and is utilized as video signal for television transmission via transmitting means 38.

Intermittent mechanism 15 is operated, for example as already described in connection with Fig. 2, in such timed relation to the scansion movement of ray 43 that the film pull down occurs always during a period of field retrace, such pull down taking place alternately after two and after three complete scans, as indicated in Fig. 1. A light shutter is provided for light beam 49 and is operated in such timed relation to intermittent mechanism 15 as to cut off the illumination from aperture 16 during film pull down. A rotary shutter is shown illustratively at 53 in position to intersect the light beam at the intermediate aerial image 46 of light source 45. That shutter position is preferred because the light beam has minimum diameter at such an image, providing sharper cut off for a shutter operating at any given blade velocity. As illustrated, shutter 53 is driven by a synchronous motor 54 which receives alternating current of appropriate frequency and phase from master synchronizer 30*a*.

Whereas it is only necessary to intercept light beam 49 during the film pull down movement, it is convenient and desirable to cut off the light during every period of field retrace, whether or not a film pull down coincides with that particular retrace. That simplifies shutter operation and insures uniform exposure of mosaic 40 on successive scansion cycles. The preferred manner of operating shutter 53 with relation to the system as a whole can be visualized qualitatively from Fig. 1 by considering curve A to represent the shutter action, elevated portions S representing open shutter and hence film and mosaic illumination, and depressed portions R representing closed shutter and hence interruption of projection of image 50.

As cathode ray beam 43 passes in scansion over mosaic 51 the selectively accumulated charge is removed, clearing the mosaic of the stored electrical image of film 10. Since the optical image 51 of the film remains illuminated during beam scansion, a fresh electrical image begins to be built up on each element of the mosaic immediately after each passage of ray 43 over that element. For a typical mosaic element, the new charge is only partially developed during the remainder of that ray scansion period, and the process of charge development is interrupted during the following period of field retrace, since optical image 51 is then darkened by shutter 53. However, immediately following field retrace, image 53 is restored and the process of developing charge at each illuminated mosaic element continues. By the time the scanning ray returns to any particular element, that element has been exposed to image 51 for a total time (since the last passage of ray 53) equal to one full field scansion period (S in Fig. 1). That exposure occurs partly during one scansion period and partly during the immediately succeeding scansion period, the ratio of the time during the two scansion periods depending upon the position of the mosaic element in the area scanned. That division of the charge development between two scansion periods of the ray, or between two illumination periods of film 10, is a characteristic of the present system, and occurs whether or not the film is advanced between those two periods. When the film is so advanced, the mosaic charge is made up partly from the image of one film frame and partly from the image of the succeeding film frame, tending to render the illusion of movement more smooth by a rapid dissolve between the successive frames of the motion picture film.

Figs. 4–8 represent a preferred illustrative film intermittent mechanism in accordance with the present invention. In the particular form shown, all moving parts of the intermittent mechanism are mounted on the housing 60, which is removably secured to the main frame 62 of the machine by means of a circular flange 64 and screws 65. A film guide, indicated generally by the numeral 70, and shown schematically in Figs. 4 and 8, is mounted on main frame 62 by any suitable means, not shown, in cooperating relation with the intermittent mechanism. Film guide 70 typically includes a fixed plate 72, vertically channeled as indicated at 73 to receive and guide a film 75, and a retaining plate 74, adapted to releasably confine the film 74 in channel 73 while permitting film movement along that channel. Both plates of the film guide are slotted, as at 77 to provide access of the film advancing claws to the film. As shown, film guide 70 is substantially vertical, the forward direction of film advance along the guide being downward. While the particular illustrated orientation of the mechanism is adopted for convenience of description, that position and the structural details of the present embodiment are purely illustrative, and are not intended as a limitation upon the scope of the invention.

The cam-actuated claw arm is shown in illustrative form at 80, directly carrying three film engaging claws 82. The claw arm is substantially flat and is slidingly confined to a vertical plane between the front face 61 of housing 60 (as seen in Fig. 4) and the back face of front cover plate 67. Movement of the claw arm in its plane is controlled by three types of restraint. The claw arm is slidingly pivoted with respect to a horizontal pivot axis 90. As shown, the pivot block 91 is slidably received in pivot ways 92 that extend longitudinally of the claw arm and may comprise the lateral edges of a longitudinal slot 93 which will be referred to as the pivot slide.

Movement of the claw arm longitudinally of pivot slide 93 is controlled by a meshing cam mechanism 100, so called because it controls the meshing engagement of claws 82 with perforations 85 of a film 84 in film guide 70. As illustrated, meshing cam mechanism 100 comprises two complementary peripheral cams 102 and 103, rigidly mounted on a common meshing cam shaft 104, with cam 102 axially outward of cam 103 on the shaft. Outer and inner cams 102 and 103 engage respective cam follower pins 106 and 107 which project from the inner face of the claw arm. Meshing cam shaft 104 is journalled on pivot axis 90, as by ball bearings indicated at 108 and 109 and mounted in a bore 110 in housing 60. Those bearings are spaced by inner and outer spacing sleeves 111 and 112 and are retained by a ring 113 threaded into the front of the bore. Pivot block 91 may be rotatably mounted, as shown, on the front end of meshing cam shaft 104, on which it is axially confined between the head of retaining screw 95 and outer cam 102.

Swinging movement of claw arm 80 about pivot axis 90 is controlled by a pull down cam 130, preferably of constant width type and working between upper and lower follower surfaces 134 and 135 on the claw arm. As illustrated, those follower surfaces comprise edges of an aperture 136 in the claw arm, and are curved about a common axis of curvature that lies generally below and parallel to the axis of rotation of pull down cam 130. That cam, as illustrated, is integral with its shaft 138, which is journaled on axis 139 as by the ball bearings indicated at 141 and 142 mounted in a through-bore 143 of housing 60 with inner and outer spacing sleeves 145 and 146 and secured by a retaining ring 147 threaded into the rear end of the bore.

Pull down cam 130 is preferably of the familiar heart type, as illustrated, which has the advantage that it is capable of producing relatively rapid claw strokes separated by periods of claw dwell. The particular cam shown is based on a dwell angle of 110°. Each period of claw dwell therefore corresponds to 110° of cam rotation relative to follower surfaces 134 and 135, the alternating forward (downward in the present embodiment as shown) and return strokes making up together the remaining 140° of such cam rotation. With the cam rotating counterclockwise as seen in Fig. 4, the downward claw stroke occupies an angle of cam rotation relative to fixed housing 60 equal to 70° minus the angle through which the claw arm swings in its forward stroke about pivot axis 90. In the particular mechanism shown, the latter angle is approximately 9°, so that the downward claw stroke corresponds to about 61° of cam shaft rotation.

Pull down cam 130 is of such dimensions, with regard to the relative locations of pivot axis 90, cam axis 139 and film guide 70, that each downward movement of the claw arm produces a downward stroke of claws 82 of suitable length to advance the film along guide 70 one film frame. Such a film advancing stroke occurs whenever meshing cam mechanism 100 acts to maintain the claw arm in extended position, with claws 72 engaging the film, during a downward stroke of pull down cam 130.

Intermittent mechanisms are well known in which the claws are caused to engage the film during every downward stroke of the pull down cam; and also in which film engagement occurs on alternate downward claw strokes. The present invention provides means by which a multiple periodic schedule of film engagement may be produced; that is to say, a schedule in which one complete cycle of periodic meshing movement includes a plurality of different intervals between successive periods of film engagement. In the particular embodiment here described as an illustration, two different intervals are provided. One interval between successive film engagements (measured, for example, between the midpoints of the respective periods of film engagement) corresponds to two complete cycles of the pull down cam, and the other interval corresponds to three such cycles. The mechanism alternates between those two intervals, so that a complete cycle of the periodic meshing action, including one interval of each type, corresponds to five complete cycles of the pull down movement. Thus the present embodiment of the invention advances the film two frames every five complete cycles of pull down cam 130.

That is accomplished, in the present instance, by providing meshing cam means having a multiple periodic cycle of action, each complete cycle of periodic action including two excursions of the claw arm into film engaging position at phase angles, with respect to the entire cycle, that are separated by 144 degrees. And means are provided for driving the meshing cam means in definite timed relation to the rotation of the pull down cam, so that one complete cycle of the meshing action (including two meshing excursions) corresponds to five full rotations of the pull down cam. The phase relationships of that driving connection are so arranged that the meshing excursions of the claws are properly coordinated with downward strokes of the pull down cam. In particular, on each meshing excursion the claws are preferably caused to move into and out of film engagement during successive dwell periods of the pull down cam, and to maintain full and uniform film engagement throughout the pull down stroke that intervenes between those dwell periods.

The particular meshing cam mechanism of the present embodiment, as already stated, includes two axially separated complementary, cams 102 and 103, which engage opposed follower pins 106 and 107. Those pins are rigidly fixed in claw arm 80, projecting from its inner face parallel to cam shaft 104. Pin 106 is only long enough to engage outer cam 102, while pin 107, which is longer, extends across the peripheral faces of both cams, but in effect may be considered to engage only inner cam 103. The pins are arranged on the longitudinal axis of claw arm 80, near opposite ends of pivot slide 93, with shorter pin 106 at the end toward claws 82 and longer pin 107 away from them. The pin separation is substantially equal to the constant effective diameter of the two cams, considered as a unit, so that the longitudinal position of the claw arm is positively determined for all rotational cam positions. Outer cam 102, acting on pin 106, may be considered to produce extension of the claws into film engagement; and inner cam 103, acting on pin 107, to produce retraction of the claws out of film engagement.

The peripheral face of outer cam 102 has two concentric circular dwell surfaces 117 and 118 of equal radius but of unequal angular extent, surface 117 being the shorter. Between those two dwell surfaces are two cam lobes 119 and 120. As illustrated, lobes 119 and 120 are of identical shape. Each comprises a circular dwell surface 121, concentric with the cam shaft and of larger radius than surfaces 117 and 118, and stroke surfaces 122 and 123 separating dwell surface 121 from 117 and 118 respectively. As shown, stroke surfaces 122 and 123 are cylindrically concave and meet surfaces 117 and 118 tangentially. The two cam lobes 119 and 120 are located 144° apart (on centers) with respect to the cam axis of rotation. Alternatively, of course, the lobes may be considered to be 216° apart, since their angular spacing may be measured in either direction around the cam. An analogous equivalence in manner of definition holds for any phase relation between cyclic phenomena, and is sufficiently familiar to cause no difficulty. In the present specification and claims the definition of a phase relationship or of any analogous angular relationship in terms of a particular angle is not intended to imply that the same relationship might not be defined in terms of a different angle.

The peripheral face of inner cam 103 is complementary to that of cam 102. Thus cam 103 has two concentric dwell surfaces 124 and 125 of radius equal to that of lobe dwell surfaces 121, and of different angular lengths equal respectively to those of dwell surfaces 117 and 118 of cam 102. Cam 103 has two dwell surfaces 126 which correspond in angular extent to the lobe dwells 121 of cam 102, and which are equal in radius to dwell surfaces 117 and 118 of that cam. The stroke surfaces 127 of cam 103, as shown, are cylindrically concave and meet dwell surfaces 126 tangentially. The two cams are mounted on shaft 104 in fixed rotational relation with their corresponding surfaces in opposite phase, since their respective followers 106 and 107 are 180° apart. As shown, outer cam 102 is provided with an elongated collar 105, by which it is keyed to shaft 104, and which carries both cam 103 and a gear 165, by which the cam shaft is driven, as will be described. The relative rotational position of the two cams may be fixed by a pin 115, while gear 165 may be keyed to collar 105.

The effect of cam mechanism 100 can conveniently be visualized in terms of outer cam 102 alone, inner cam 103 being then considered merely as a means for maintaining pin 106 always in contact with cam 102. From that viewpoint it may be seen at once that upon each rotation of cam 102 each of the cam lobes 119 and 120 displaces pin 146, and hence the entire claw arm, longitudinally of pivot slide 93 in a direction to cause claw engagement with film 75. That film engagement is established during passage of pin 106 over a lobe stroke surface 119 (the direction of cam rotation being counterclockwise as seen in Fig. 4); is maintained during passage of pin 106 over the lobe dwell surface 121 (as shown typically in Figs. 4 and 5); and is released during passage of pin 106 over the lobe stroke surface 123. The angular extent of dwell surfaces 121 of the equal cam lobes is preferably sufficient to maintain film engagement throughout a downward stroke of pull down cam 130, taking account not only of rotation of meshing cam 102, but also of the simultaneous rotation of pin 106 about the cam axis caused by the clockwise pull down stroke of the claw arm. That stroke, as stated above, involves approximately 9° in the particular embodiment shown.

Since the two meshing lobes of cam 102 are spaced non-uniformly about the periphery of the cam, the resulting film engaging excursions of the claw are correspondingly non-uniformly spaced in time (assuming constant speed of meshing cam shaft 104). Any desired relative phase positions of those excursions with respect to a complete cycle of meshing action (one full rotation of cam shaft 104 in the present instance) can be obtained by suitable angular location of the meshing lobes of cam 102. If meshing cam 104 is driven at non-uniform speed, for example in accordance with a periodically repeated cycle of speed variation, or if one revolution of cam 102 does not correspond to one full cycle of meshing action, the angular spacing and number of cam lobes on cam 102, or its equivalent, may be varied accordingly.

The entire intermittent mechanism, as shown, is driven from a driving shaft 160, journaled in parallel but offset relation to pull down cam shaft 138. Drive shaft 160 is journaled in drive shaft housing 162, which is rigidly but removably mounted upon the back of main housing 60. One end of the drive shaft projects rearwardly from its housing, and is adapted to carry driving means such as the gear 161, by which the shaft may be driven at uniform speed in any usual manner. The preferred speed of that drive, for coordination of the present illustrative mechanism with present television equipment is 60 revolutions per second. The other end of drive shaft 160 carries a fixedly mounted gear 165 by which meshing cam shaft 104 is driven by means to be described, and is also provided with a driving connection to pull down cam shaft 138.

That latter connection, denoted generally by the numeral 170, is of a type that acts as an accelerator, translating the uniform rotation of drive shaft 160 into non-uniform rotation of shaft 138. That non-uniform rotation varies periodically during each revolution, so that shaft 138 passes through certain angular positions at a relatively accelerated speed, and through other positions at a relatively reduced speed, the average speed remaining unaffected. Hence the cyclic frequency of pull down cam shaft 138 is qual to that of drive shaft 160, accelerator 170 acting as a 1:1 connection so far as complete revolutions of the two shafts are concerned.

Figures 5, 6:
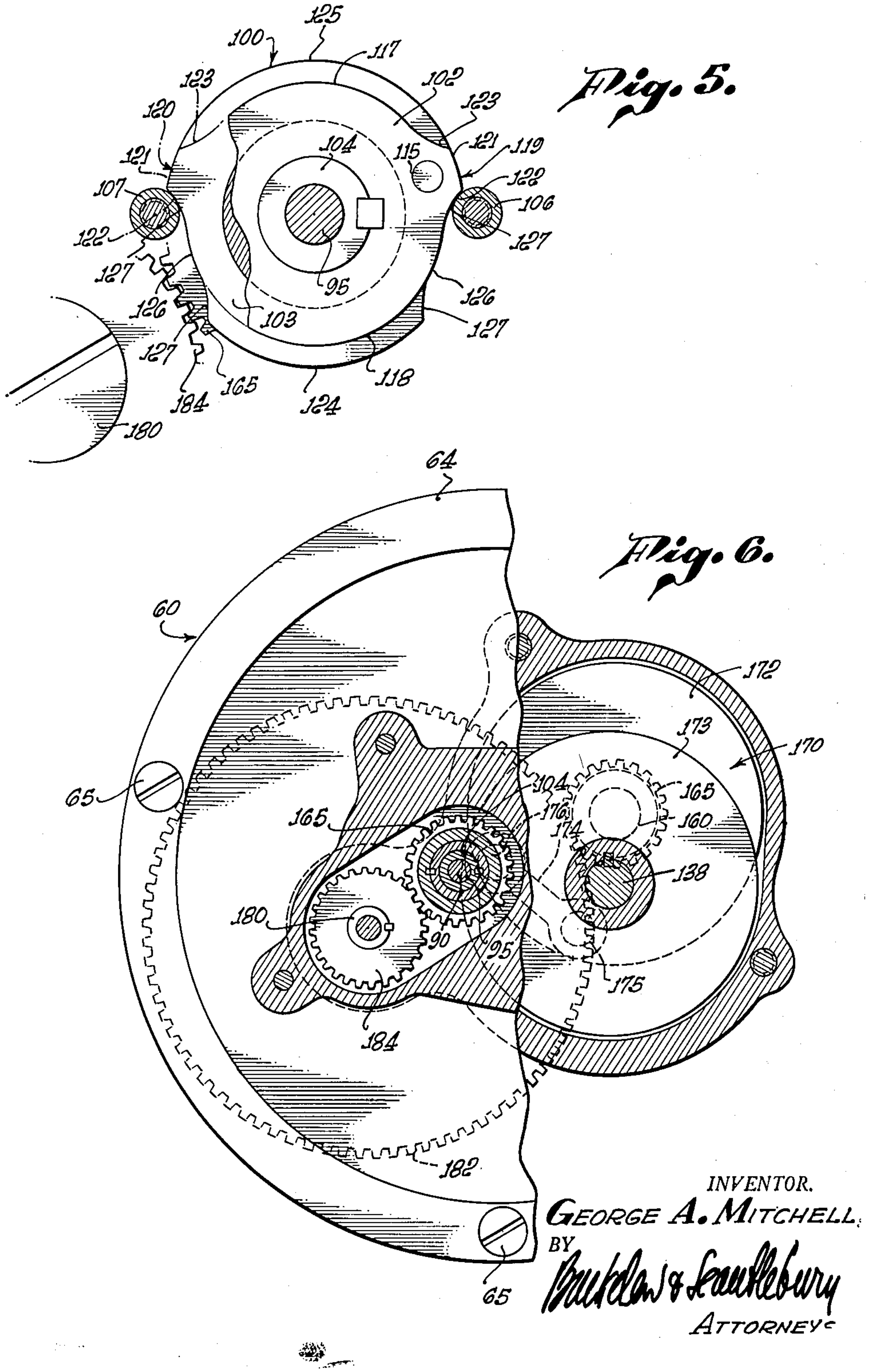
Fig. 5 is a fragmentary vertical section at enlarged scale, in the same aspect as Fig. 4 and taken on line 5—5 of Fig. 8 and rotated 90° to accord with Fig. 4.
Fig. 6 is a vertical section in the same aspect as Fig. 4, taken on line 6—6 of Fig. 8 and rotated 90°.

The particular type of accelerator illustrated comprises a driving disk 172 fixedly mounted on driving shaft 160, a driven disk 173 similarly mounted on driven shaft 138 in axially spaced relation to disk 172, and a link 174 connecting the two disks. Link 174 is pivotally connected to each of the disks, the pivot axes being parallel and eccentric to the respective shafts 138 and 160. As shown, pivot studs 175 and 176 are fixed in the respective disks 172 and 173 at equal radii from their respective shafts, those radii being considerably greater than the offset between the shafts and somewhat greater than the effective length of link 174. Pivot 175 leads pivot 176 in the counterclockwise rotation of the shafts (as seen, for example, in Fig. 6), and the phasing of the accelerator with respect to pull down cam 130 is typically such that pivot 176 in driven disk 173 is about 90° beyond its position of closest approach to the axis of driving shaft 160 at the start of the pull down stroke of cam 130. That position is shown in Figs. 4 and 6, for example. With the particular accelerator structure and proportions shown, the downward stroke of cam 130, which requires about 61° of cam rotation as already explained, takes place during rotation of driving shaft 160 through an angle of only about 27°.

It will be understood that many different types of mechanical accelerator are available, and that the degree of effective acceleration of the pull down stroke of cam 130 is variable by modification of the physical constants of the particular mechanism used. Moreover, the stroke angle of cam 130 itself may be selected to give substantially any desired speed of pull down, subject only to practical limitations, either with direct drive of the cam shaft or with an accelerator having predetermined properties. The particular combination of cam angle and accelerator proportions here illustratively shown represents a preferred embodiment.

As illustrated, meshing cam shaft 104 is driven in the same direction as pull down cam shaft 138 (counterclockwise as seen in Figs. 4 and 5) and at one fifth of the average speed of shaft 138, that is, at one fifth the speed of driving shaft 160. The gear train by which that is accomplished is shown typically as including the idler shaft 180, journaled in housing 60. On shaft 180 are fixedly mounted the relatively large idler gear 182 which engages, and is driven from, gear 161 on drive shaft 160, and the relatively small idler gear 184 which engages and drives gear 165 on the meshing cam shaft. As shown, the gears 184 and 165 are of the same size, while gear 182 has five times as many teeth as driving gear 161. However, the speed of idler shaft 180 is immaterial, and the relative sizes of the four gears (or their equivalent) may be selected for convenience of design so long as the overall speed ratio between shafts 160 and 104 has the required value. In particular, it will be understood that idler shaft 180 may be dispensed with, meshing cam shaft 104 being driven directly from drive shaft 160 at the stated speed ratio. Meshing cams 102 and 103, and particularly the angular extent of lobe dwell surfaces 121, being modified to take account of the opposite direction of rotation of shaft 104. Alternatively, meshing cam shaft 104 may be driven from pull down cam shaft 138, cams 102 and 103 being then suitably modified to take account of the periodic speed variation caused by accelerator 170.

In the present embodiment, in which a forward stroke of pull down cam 130 occupies about 27° of rotation of driving shaft 160, and in which meshing cam shaft 104 is driven at one fifth of the driving shaft speed, the meshing cam shaft turns (relative to the frame) only about 5.5° during a pull down stroke. However, as explained, the angular extent of lobe dwell surfaces 121 is preferably at least equal to that angle plus 9°, to provide for the pull down swing of the claw arm. As illustrated, the lobe dwell angle 121 is approximately 17.5°. If the meshing cam were driven in the same direction as the forward strokes of the claw arm (clockwise as shown in Fig. 4, for example), as would be true, for example, if idler shaft 180 were eliminated and shaft 64 geared directly to driving shaft 160, the lobe dwell surfaces might be reduced, at least in theory, to about 9° minus 5.5°, or about 4°.

I claim:

1. An intermittent film movement of the claw type, comprising in combination with a film guide, a pivot spaced transversely from the plane of the film guide, a claw arm slidingly pivoted at one end on the pivot, extending from the pivot toward the film guide, and carrying a film engaging claw at its free swinging end, a rotatable pull down cam engaging the claw arm to move the free end of the arm in a movement cycle composed of a pull down stroke and a return stroke longitudinal of the film guide, the engagement of the cam with the claw arm allowing movement of the claw arm and its claw radially of the pivot and transversely of the film guide into film-meshing and unmeshing positions, a rotatable meshing cam mounted for rotation about the pivot axis, two cam followers mounted on the claw arm at diametrically opposite sides of the pivot axis and engaging the periphery of the meshing cam at diametricaly opposite points, the meshing cam being composed of first and second cam members, the first cam member being peripherally engaged by one of the followers and having a peripheral cam face with two projecting cam lobes, spaced 144° apart about the cam axis, and engaging said follower to move the claw arm into film meshing position, the second cam member being peripherally engaged by the other follower and having a peripheral cam face complementary in form to the cam face of the first cam, the pull down cam driving the claw arm through one complete movement cycle for each revolution of the cam, and means for driving the two cams in the ratio of five revolutions of the pull down cam for each revolution of the meshing cam.

2. An intermittent film movement of the claw type, comprising in combination with a film guide, a pivot spaced transversely from the plane of the film guide, a claw arm slidingly pivoted at one end on the pivot, extending from the pivot toward the film guide, and carrying a film engaging claw at its free swinging end, a rotatable pull down cam engaging the claw arm to move the free end of the arm in a movement cycle composed of a pull down stroke and a return stroke longitudinal of the film guide, the engagement of the cam with the claw arm allowing movement of the claw arm and its claw radially of the pivot and transversely of the film guide into film-meshing and unmeshing positions, a rotatable meshing cam mounted for rotation about the pivot axis, cam follower means mounted on the claw arm and engaging the meshing cam, the meshing cam having a first and second peripheral cam face, the first peripheral cam face having two projecting cam lobes, spaced 144° apart about the cam axis, and engaging the follower means to move the claw arm into film meshing position, the second peripheral cam face being complementary to the first and engaging the follower means to keep it in engagement with the first peripheral face, the pull down cam driving the claw arm through one complete movement cycle for each revolution of the cam, and means for driving the two cams in the ratio of five revolutions of the pull down cam for each revolution of the meshing cam.

3. An intermittent film movement of the claw type, comprising in combination with a film guide, a pivot spaced transversely from the plane of the film guide, a claw arm slidingly pivoted at one end on the pivot, extending from the pivot toward the film guide, and carrying a film engaging claw at its free swinging end, a rotatable pull down cam engaging the claw arm to move the free end of the arm in a movement cycle composed of a pull down stroke and a return stroke longitudinal of the film guide, the engagement of the cam with the claw arm allowing movement of the claw arm and its claw radially of the pivot and transversely of the film guide into film-meshing and unmeshing positions, a rotatable meshing cam mounted for rotation about an axis parallel to the pivot axis, cam follower means mounted on the claw arm and engaging the periphery of the meshing cam, the meshing cam having two peripheral portions of radius different from that of the remainder of the cam periphery, said portions adapted on engagement with the follower means to cause movement of the claw arm to film engaging position, said two portions being spaced apart by an angle about the cam axis represented by $x$ in the fraction $$\frac{x}{y}$$

where $x$ and $y$ are whole numbers, $x$ is less than $y$, and $x$ plus $y$ represents the rotational angle of a complete cycle of the meshing cam; means for keeping the follower means in engagement with the cam periphery, and means for driving the two cams at a rotary ratio such that the meshing cam rotates through one complete cycle for the number of cycles of the pull down cam equal to $x$ plus $y$.

4. The combination defined in claim 3 and in which $x$ plus $y$ represents 360°.

5. The combination defined in claim 3 and in which the driving means for the two cams includes, in the drive of the pull down cam only, a drive transmission element which accelerates the rotary movement of that cam during the pull down stroke of the claw arm and correspondingly decelerates the cam rotation during the return stroke of the claw arm.

References Cited in the file of this patent

UNITED STATES PATENTS

| | | |
|---|---|---|
| 2,082,093 | Bedford | June 1, 1937 |
| 2,329,624 | Kellogg | Sept. 14, 1943 |
| 2,404,839 | Hammond | July 30, 1946 |
| 2,415,390 | Konkle | Feb. 4, 1947 |
| 2,420,444 | Ress | May 13, 1947 |
| 2,475,622 | Kuehn | July 12, 1949 |
| 2,481,115 | Heurtier | Sept. 6, 1949 |
| 2,560,994 | Sleeper | July 17, 1951 |
| 2,590,281 | Sziklai et al. | Mar. 25, 1952 |